Patented Mar. 7, 1933

1,900,209

UNITED STATES PATENT OFFICE

KENZO TAMURA, OF IRIARAI-CHO, GYOKUJO KIHARA, OF SUNA-MACHI, YASUHIKO ASAHINA, OF TOZUKA-CHO, AND MORIZO ISHIDATE, OF SUGINAMI-CHO, JAPAN

METHOD OF MANUFACTURING PURE PARA-HYDROXYCAMPHOR

No Drawing. Application filed April 10, 1931, Serial No. 529,288, and in Japan April 25, 1930.

This invention relates to improvements in a method of manufacturing a pure para-hydroxycamphor, genuine in chemical and physiological properties, from a compound of the campherol and glucuronic acid excreted in the urine of a living body which has taken camphor internally. The object of this invention is to produce para-hydroxycamphor, at a comparatively low cost, which is used as the raw material for the manufacture of P-Oxo-camphor.

It is already known that camphor, if administered to a living body, e. g. a dog, undergoes a chemical change, and is excreted in the urine after being converted into a compound of glucuronic acid. Schmiedeberg and Meyer obtained a substance almost identical with hydroxycamphor by resolving a barium salt which had been transformed from the glucuronic acid compound present in the urine of a dog to which camphor had been given internally.

In a known method, the urine excreted by a dog which has been given a certain amount of camphor internally, is evaporated so as to make up a syrup, to which is added a large amount of barium salt, and also of absolute alcohol for precipitation of a substance which has combined with barium, and the precipitate is then purified. By repeating the same process several times, a compound of glucuronic acid and barium salt is yielded which is then resolved with hydrochloric acid of 5 to 10%, and from the resolved substance is finally obtained campherol by extraction with ether.

The said method, however, not only requires a disagreeable labour of evaporating a large amount of urine but also it is circuitous and is liable to losing much of the desired substance owing to the high solubility of barium salt.

According to our invention, a plumbic salt is added with ammonia to the urine in order to produce a plumbic compound from the glucuronic acid of camphor contained in the urine, and cause the former to precipitate; the precipitate thus obtained is made, through separation and purification by dilute acids, into a substance identical with campherol, which is then separated and purified with ligroine or other benzenes. Thus the invented method allows the glucuronic acid compound to precipitate after being converted into a plumbic salt, without the necessity of evaporation and concentration of the excreted urine as stated above.

This new method has other advantages, which are no less important than the above mentioned. It allows the whole of the glucuronic acid compound to precipitate after being converted into a plumbic salt; and, the use of plumbic salt with ammonia allows the resulting substance to remain stable without the danger of becoming easily resolvable as is the case if barium salt alone is used; and further, there is no loss of glucuronic acid since the whole of the compound precipitate, without any loss, is transformed into a plumbic salt.

There is a reason to believe the so-called campherol obtained according to the already known method is not a chemically single compound, as the oxydation product derived therefrom is proved to be a mixture of at least two hydroxo-camphors. On the contrary, this invented method does not fail to produce a chemically and physiologically pure para-hydroxycamphor from which a physiologically genuine oxo-camphor can be obtained.

The invented method is further described referring to an example.

To 3 litres of the urine excreted by a dog to which camphor has been given internally at the rate of about 5 grams a day, is added 300 c. c. of warm saturated solution of lead acetate; the depositing impurity is removed by filtration; and to the transparent filtrate is added 800 c. c. of a saturated solution of lead subacetate and an amount of ammonia water. The compound of campherol and glucuronic acid present in the urine will entirely be deposited being transformed into a white plumbic salt; collect the precipitate, and treat it with dilute sulphuric acid; filter off the resulting white powder-like precipitate which consists chiefly of lead sulphate; keep the filtrate in a properly acidified state by the use of the sulphuric acid existing in the filtrate; hydrolyze it by heating on a water bath for several hours. Add ether to the filtrate on cooling and, after vigorously shaking, take the ethereal portion, then distil off the ether. The substance left is digested with warm ligroine. On cooling the pure para-hydroxy camphor separates from the solution.

The para-hydroxycamphor thus produced is of colourless crystals in the form of tablet with melting point of 217° to 218° C., the specific optical rotation being +41.3.

The formula of the chemically pure para-hydroxycamphor produced in accordance with this invention is

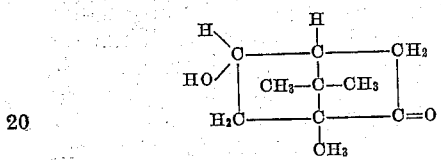

What we claim is:

1. A method of manufacturing para-hydroxycamphor from a compound of campherol and glucuronic acid excreted in the urine of living bodies to which camphor has been given internally, characterized by the fact that the compound is transformed into a precipitate of a plumbic compound by the addition of lead acetate with ammonia, and the said precipitate is resolved with dilute acids into campherol, which is treated with benzene in order to liberate and purify the desired substance.

2. A method of manufacturing para-hydroxycamphor from a compound of campherol and glucuronic acid excreted in the urine of living bodies to which camphor has been given internally, characterized by the fact that the compound is transformed into a precipitate of a plumbic compound by the addition of lead acetate with ammonia, the said precipitate is resolved with dilute sulphuric acid into campherol, hydrolyzing the same by heat, adding ether to the filtrate after cooling, separating the ethereal portion, distilling off the ether, and treating the remaining substance with ligroine.

In testimony whereof we have signed our names to this specification.

KENZO TAMURA.
GYOKUJO KIHARA.
YASUHIKO ASAHINA.
MORIZO ISHIDATE.